Aug. 7, 1962  R. T. HEADRICK  3,048,275
FILTER-WATER SEPARATOR
Filed Aug. 13, 1957  3 Sheets-Sheet 1
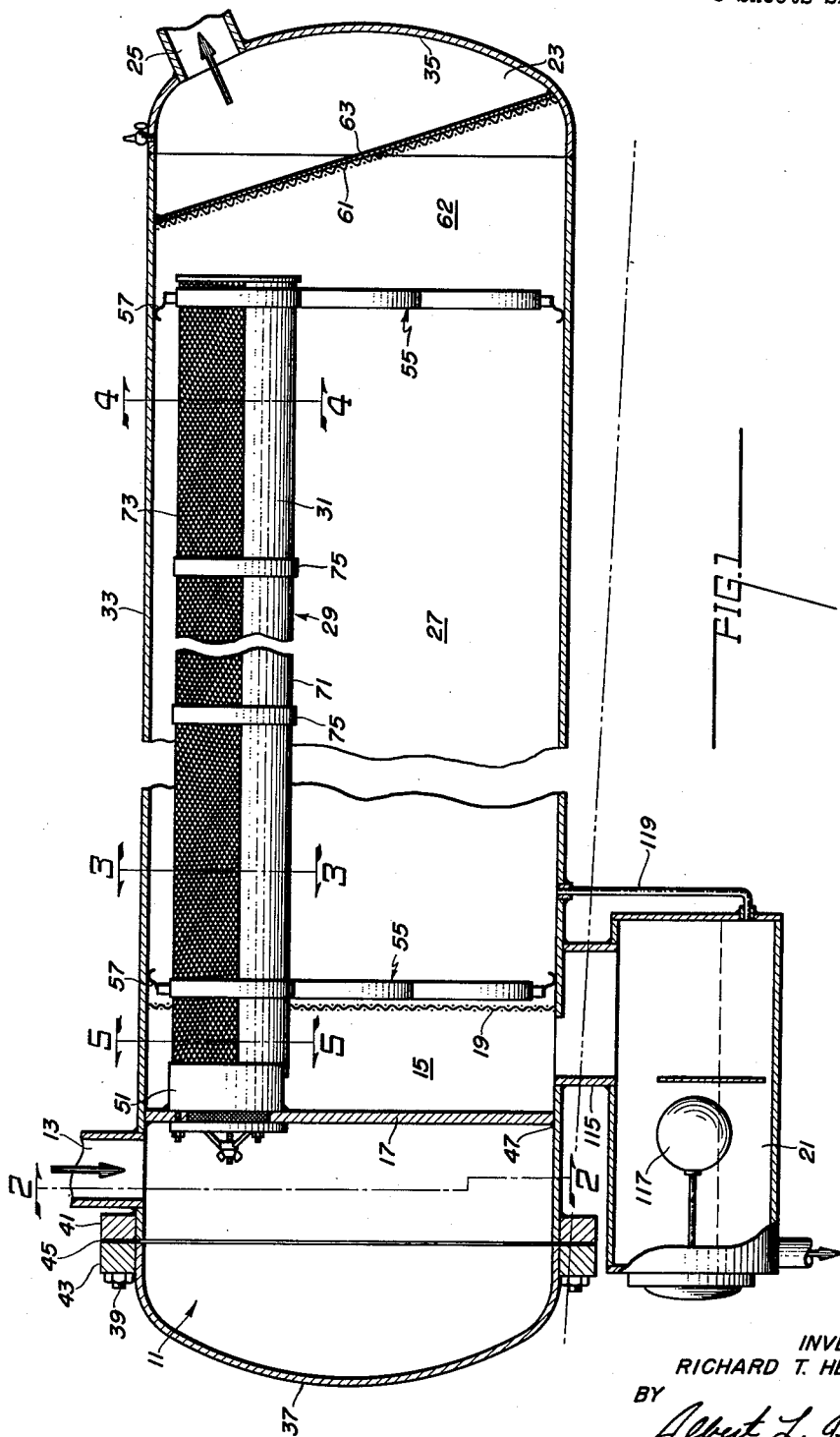
INVENTOR.
RICHARD T. HEADRICK
BY
Albert L. Jeffers
ATTORNEY Aug. 7, 1962  R. T. HEADRICK  3,048,275
FILTER-WATER SEPARATOR
Filed Aug. 13, 1957  3 Sheets-Sheet 2
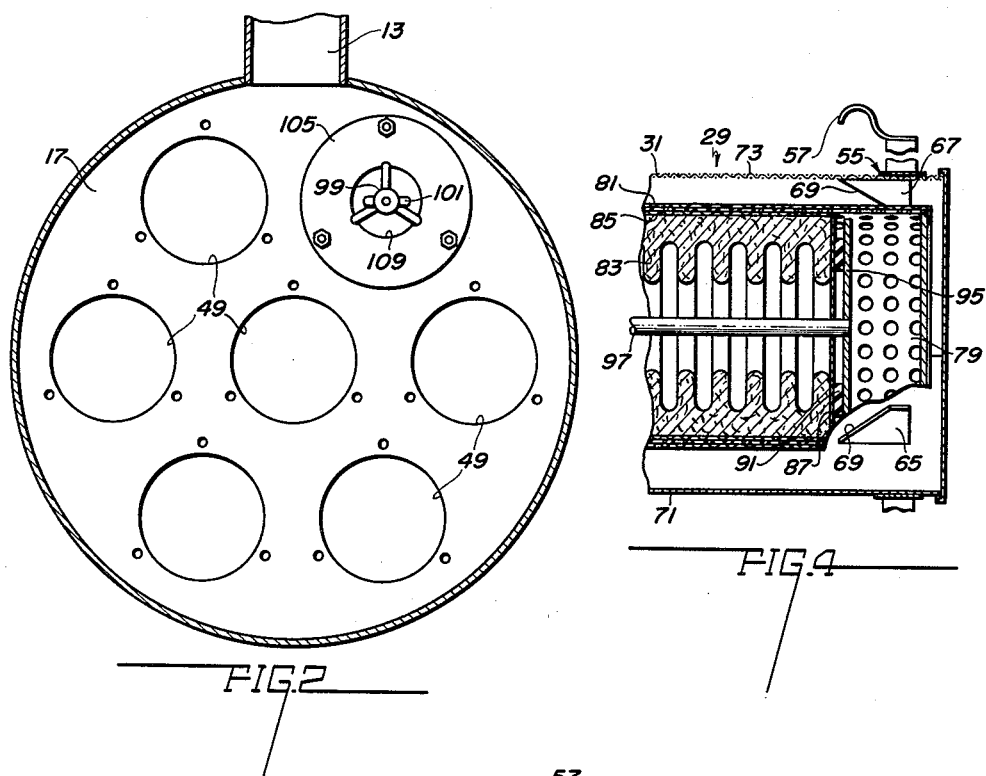
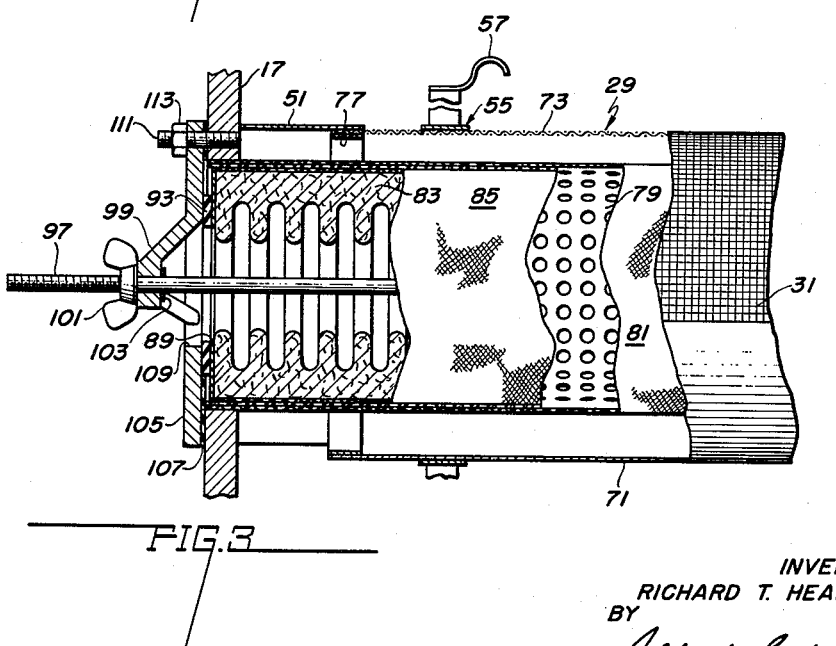
INVENTOR.
RICHARD T. HEADRICK
BY
Albert L. Jeffers
ATTORNEY Aug. 7, 1962  R. T. HEADRICK  3,048,275
FILTER-WATER SEPARATOR
Filed Aug. 13, 1957  3 Sheets—Sheet 3

INVENTOR.
RICHARD T. HEADRICK
BY
*Albert L. Jeffers*
ATTORNEY

United States Patent Office 3,048,275
Patented Aug. 7, 1962

3,048,275
FILTER-WATER SEPARATOR
Richard T. Headrick, Fort Wayne, Ind., assignor to Bowser, Inc., Fort Wayne, Ind., a corporation of Indiana
Filed Aug. 13, 1957, Ser. No. 677,923
6 Claims. (Cl. 210—247)

The invention relates generally to means for conditioning a liquid and more particularly is directed to apparatus or system which serves to remove substantially all foreign matter, and particularly water, from liquids, such as light fuels, jet fuels, petroleum, solvents and distillates.

The apparatus is particularly designed and constructed for use in purifying fuels used in aircraft engines where efficient operation is of primary importance. The invention in actual use has proven exceptionally advantageous in filtering and dehydrating such fuels so as to positively assure freedom from engine failures or erratic operation, incomplete combustion, accumulation of ice crystals or other foreign matter in aircraft fueling system orifices or strainers, corrosion and undue accumulation of calcium and other chemical deposits frequently due to sludge and water.

With the above in mind, one of the principal objects of the invention is to provide an apparatus or system whereby the water separated from the contaminated fuel is prevented from flowing along with the filtered fuel into the main area or chamber of a tank.

More particularly, a significant object of the invention is to provide an apparatus embodying improved principles of design and construction comprising, among other things, a tank having an entrance chamber, a water receiving chamber, a relatively large central circulating chamber, a plurality of filter means extending longitudinally into the chambers, and means operatively associated with the filter means for directing the water filtered out of the contaminated fuel into the water receiving chamber so that it will not flow into the central chamber and out through an outlet or line connected thereto. Otherwise expressed, the main or central chamber is held substantially dry or free of water. This carry-back or shunting out of the water constitutes a meritorious advance as distinguished from the conventional systems now in commercial use which permit the water to mix with or fall through the filtered fuel in the main circulating area of the tank within which the filter means is disposed. The subject system also affords a highly efficient filter-separator having a wide margin of safety factor in operation and substantially prevents carry-over of water into the fuel outlet at high flow ratio.

A further object of the invention is to provide apparatus which offers advantages when its size constitutes a factor commensurate with its successful operation. In other words, an object is to provide a filter-separator of minimum over-all dimensions where installation specifications require such a piece of equipment. This is particularly desirable and true of ground support equipment vehicles where the overall silhouette must be kept to a minimum.

The structure embodying the subject invention also offers advantages with respect to manufacture and assembly, installation, durability, replacement of filter means, automatic and efficient operation, and low cost of maintenance and repair.

Other objects and advantages of the structure reside in the improved principles of design and construction embodied in the filter means, means for mounting the filter means, the water receiving chamber and the means employed for directing the water filtered out of the contaminated fuel or liquid in a direction opposite to normal flow of the fuel into the water receiving chamber, a sump which is directly connected to the water receiving chamber for automatically discharging the water, and water discharge line communicatively connected to the sump and the central chamber for removing any water from the latter area.

Additional objects and advantages of the invention will become apparent after the description hereinafter set forth is considered in conjunction with the drawings annexed hereto.

In the drawings:

FIGURE 1 is a side elevational view of the structure incorporating the invention, with portions broken away and parts in section to exemplify details of design and construction;

FIGURE 2 is a transverse section taken substantially on line 2—2 of FIGURE 1 showing details of a support or deck plate;

FIGURE 3 is a transverse section taken substantially on line 3—3 of FIGURE 1 showing details of the canister and filter-water separator;

FIGURE 4 is a transverse section taken substantially on line 4—4 of FIGURE 1 showing details of the canister and filter-water separator;

Figure 6:
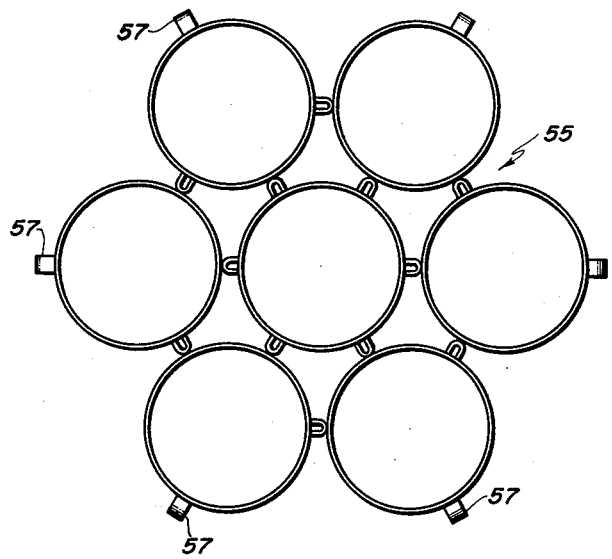
FIGURE 6 is a detail view showing the support assembly outer canister.
Figure 5:
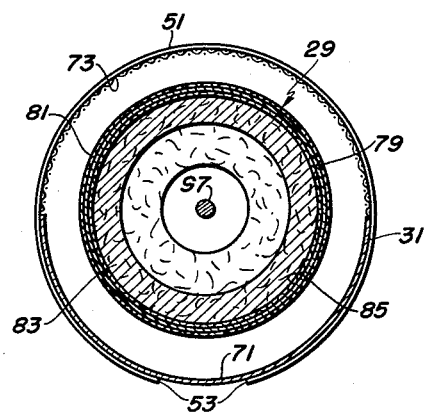
FIGURE 5 is a transverse section taken substantially on line 5—5 of FIGURE 1 depicting other structural characteristics of the filter means, including the mounting of same and relationship to other components.

The structure may be designed and constructed in various ways but as exemplified in the drawings, preferably comprises, among other things, a tank provided with an entrance chamber generally designated 11 for receiving contaminated fuel through an inlet 13 leading to such chamber, a chamber 15 defined by a support 17 and a screen partition 19 adjacent one extremity of the tank for receiving water filtered from the fuel, a sump 21 communicating with the water receiving chamber for collecting water therefrom, an exit chamber 23 adjacent the other extremity of the tank communicating with an outlet 25 through which the filtered clean fuel is discharged, a relatively large central chamber 27 located between the water receiving and exit chambers, filter means 29 communicating with the entrance chamber and extending longitudinally through and communicating with the water receiving and central chambers, container means 31 housing the filter means and provided with means for directing water filtered out of the contaminated fuel in a direction opposite to the normal flow of the fuel into the water receiving chamber where it may fall into the sump and thereby prevent flow thereof into the central and exit chambers and out through the outlet.

The tank may be mounted in any desirable way but is preferably supported in a substantially slight inclined position in case of use of elongated canisters but may be installed level when employing shorter canisters and includes a cylindrical housing 33 having an open front end and an integral rounded or convex rear end wall 35 provided with the fuel outlet 25. An end cap, head or closure 37 affording access to the interior of the housing is detachably connected to its open end by a plurality of fasteners 39 which extend into a reenforcing ring 41 fixed on the housing and a similar ring 43 fixed on the cap, with a seal 45 between the rings. The end cap is preferably dished to the extent that the integral end wall is dished and forms in combination with the support 17 the entrance chamber 11 which receives the contaminated fuel through the tubular inlet 13. This inlet may be located where desired but is preferably disposed at the upper part of the chamber.

The support 17, as shown in FIGURES 1, 2 and 3, is preferably in the form of an annular deck plate welded to the inner surface of the housing as indicated at 47 but if found desirable, the inner surface of the housing could be provided with an annular fixed abutment so that the plate could be detachably secured thereto with a seal therebetween. This support is provided with a plurality of corresponding round openings 49, the number of which is determined by the diameter of the tank, capacity, rate of flow and necessary clearances between the canisters, all of which will be described more in detail subsequently. A plurality of corresponding cylindrical segments or arcuate holders or members 51 are preferably secured to the rear side of the plate or support in substantially spaced eccentric relationship to the openings by welding as depicted in FIGURE 1. The holders 51 are each constructed to define an aperture or port 53 through which the water returned by the directing means may fall into the water receiving chamber.

The container means 31, commonly referred to in the trade as canisters, are tubular and cylindrical in shape and connected together to constitute a subassembly. More particularly in this respect, seven containers, as shown in FIGURE 2, or a number corresponding to the number of openings in the deck plate, are secured together by a pair of corresponding front and rear mountings or separator frames 55 provided with tubular formations through which the containers extend and are firmly anchored in place. The mountings are preferably provided with spring clips 57 which serve as runners to facilitate introduction of the subassembly into the tank. The filter screen 19, preferably of stainless steel, having 100 apertures to the square inch, is secured and sealed about the containers 31 in front of the front mounting 55.

Before the subassembly is installed in the tank, a partition 61 preferably in the form of an oblong stainless steel screen, similar to the screen 19 is cemented in the tank in the inclined position shown and forms in combination with the integral rear end wall of the tank the exit chamber 23 above referred to. This screen is preferably reenforced by a sheet of expanded metal 63 or equivalent means and preferably disposed at an angle of approximately 70° to the horizontal and substantially transverse to the longitudinal axis of the tubular outlet 25 located in the upper portion of the end wall. In practice, the top portion of the partition is secured to the housing at a location approximately 2″ from the inner ends of the uppermost pair of containers or canisters 31, and its lower portion to the housing at a location as far back in the end wall 35 as is mechanically possible. Otherwise expressed, the partition 61 is preferably located substantially midway and diagonally in what may be referred to as a deceleration area 62 located generally between the inner extremity of the subassembly and the end wall 35 of the tank housing. This deceleration area is an area of extremely low velocity of fuel flow immediately downstream of the ends of the containers 31. The partition primarily serves to prevent any foreign matter which may be in the tank from being drawn or flowing into the exit chamber and out through the outlet 25, and at the same time serves to prevent a high velocity area in the vicinity of this outlet, as the fuel is flowing through the tank.

An air bleed line is preferably located in the upper part of the tank housing adjacent the outlet 25 as illustrated in FIGURE 1 and is operatively connected with an air eliminator apparatus (not shown) for releasing the tank of air.

To install the subassembly in the tank it is slid therein to a predetermined position, after which the periphery of the screen 19 is cemented or otherwise sealed to the inner surface of the tank. The screen 19 is disposed in spaced parallel relationship to the deck plate and forms in combination therewith the housing and the water receiving chamber 15 above alluded to. The rear extremity of the subassembly is disposed in relatively close relationship to the rear screen 61 at the top of the tank and the fore ends of the containers extend beyond the front mounting 55 and screen 19. After the subassembly is properly positioned in the tank the deck plate is secured in place so that the holders 51 receive and/or support the fore ends of the containers which are cemented or sealed therein. The containers are each preferably provided with a pair of lower corresponding inner spacers 65 and an upper inner spacer 67 which are located adjacent the end walls. The spacers are preferably provided with cam surfaces 69 to facilitate positioning the filter means in the containers and as will be described more in detail subsequently. The lower spacers are preferably of a size in cross dimension somewhat greater than the size of the upper spacer 67 in order to assist in locating each filter means in an eccentric position in a container above its center or longitudinal axis.

The containers are unique in design and construction and constitute a major advance in the field of filtering and water separation. The containers or canisters may be made in various ways but as disclosed herein each preferably includes a lower semi-cylindrical channel or trough 71 constructed of a desirable non-perforated material such as stainless steel, and an upper semi-cylindrical member 73 of screen material of a character corresponding to the screen partitions 19 and 61 above referred to. The rear end of each container unit is closed by a solid end wall secured therein and the longitudinal marginal edges of each member 73 is preferably secured in overlapping relationship to the longitudinal marginal edges of the channel 71 for the purpose. The circumferential extent of the channel is preferably somewhat less than that of the member. In practice the circumferential extent of the channel is 160° while that of the member is 200°. Each unit is preferably reinforced by a plurality of annular bands 75 secured about the unit at longitudinally spaced locations and by an inner ring 77 at its open end as evidenced in FIGURES 1 and 3. The containers are preferably arranged in the mounting 55 so that the exterior bonds at the ends of the containers are secured in the tubular formations of the mountings.

The filter means 29 and mode of supporting them in the containers will now be described. The filter means comprises a plurality of related components which may be designed and constructed in various ways but as exemplified, each filter means includes, among other things, a tubular foraminated cylinder 79 or support having preferably ¼″ perforations and having a solid closed end wall secured thereon, a tubular filter 81 of fabric surrounding the cylinder, a tubular mass 83 of filter material disposed in the cylinder with a tubular fabric filter 85 surrounding the mass, and a clamping assembly for detachably securing each filter means 29 in a container.

More particularly in regard to the above, the rear end of each of the filter means 29 is mounted on the spacers 65 and 67 and its fore end is received and supported in the opening 49 provided in the deck plate 17, as depicted in FIGURE 3, so as to locate the filter means in an eccentric spaced relationship to the container with the clearance space between the upper portions of the container and filter means preferably being approximately ½″ while the space between the lower portions will approximate ¾″. This eccentric location of each filter means is due to the character of the spacer means and the fact that the holder members 51 are disposed in the eccentric positions with respect to the openings 49 in the deck plate as described above. The objective or purpose of providing such clearances is to provide maximum capacity for the run-back of free water into the water receiving chamber, up to and in some excess of the 3% specified in military specifications, all of which will be explained in greater detail subsequently.

If the upper clearance between the filter means and containers were less than the ½″ as set forth above, and if any water droplets either singly or accumulatively even momentarily forcibly come in contact with the 200° of the screen member, then the normal pressure differential across this screen member would cause the droplets to be forced through the screen into the central chamber of the tank. Accordingly, ½" dimension is the minimum upper clearance when the invention is utilized in a tank affording a capacity for minimum requirements in a practical installation.

Attention, however, is directed to the fact that under certain conditions, the inner cylinders could be disposed in concentric positions in the outer containers with a space preferably not in excess of ¾" therebetween. In further explanation of the space factor, the rate of fuel flow varies according to the diameter and length of a filter means or cartridges and the space between the filter means and outer containers. It is important to note that there are certain restrictive limitations on the diameter of the tank and the crowding or placing a maximum number of containers thereon will effect a violent increase in the velocity or flow through the containers and cause any free water droplets to enter the central area 27, which may possibly flow along with the filtered fuel even past the deceleration area and out through the outlet 25. Accordingly, for all practical purposes, the closest relationship of the containers with respect to one another and the wall of the tank is approximately ⅝".

The cylinders or supports 79 are preferably constructed of stainless steel or aluminum and the tubular filter 81 is preferably constructed from a suitable fabric, such as a cloth composed of 25% wool and 75% cotton, which has proven exceptionally efficient in filtering and promoting the coalescence of water into droplets of substantially uniform diametrical sizes within a range of ³⁄₁₆" to ¼" as they fall from the surface of the filter into the channels 71 of the containers. In other words, the filters 81 which are normally impervious to water possess the inherent quality or phenomenon of coalescing water droplets of a relatively large uniform size on its exterior, which size is normally more uniform than that obtained by any other known conventional set-up in commercial use. In other words, all water droplets above a desirable size are made smaller and below a desirable size are made larger.

The tubular mass 83 of filter material may be made from any material suitable for the purpose and constructed as desired, but is preferably comprised of a plurality of glass fibers compressed into annular rings of different sizes which rings are alternately stacked and held in a state of compression between a pair of end members 87 and 89 by means connecting the latter to form an elongated tubular cartridge. The tubular fabric 85 is preferably constructed of similar material as the filter 81 about the cylinder and is in the form of a tube, sock or wrap, the ends of which overlay the ends of the cartridge and are secured by cement or other suitable means under the end members. Annular resilient gaskets 91 and 93 are secured to the end members on each cartridge. One or more cartridges may be releasably held in a cylinder depending on the length of the cylinder, but as shown in the drawings, several cartridges are disposed in each of the seven cylinders and the length of the cylinder is predetermined to take a given number of cartridges. Each cartridge is preferably installed with a ratio of approximately ⅝" compression per 18" length of cartridge.

Any means suitable for the purpose may be utilized to firmly secure the cartridges in the cylinder, but as disclosed herein, they are clamped together in axial relationship by a bolt assembly comprising an inner end disc or member 95 engaging the gasket on the innermost end of the innermost cartridge to prevent leakage at this location, a threaded rod 97 extending through the cartridges or mass 85 and having one end fixed to the member 95 and its other end extending through an outer member 99 at the front of the deck plate, and a wing nut 101 on the rod for adjustably moving the inner and outer members relative to one another. A stop 103 is fixed on the rod for predetermining the extent that the cartridges can be compressed after disposition in the cylinder. Each of the outer members 99 include an annular portion 105 of a predetermined diameter for simultaneously engaging the outermost gasket on the outermost cartridge and a gasket 107 interposed between this annular portion and the deck plate. Each of the outer members also includes a center drilled portion through which the threaded rod extends and spaced converging legs joining the annular portion so that the contaminated fuel can flow between the legs and through an opening 109 in the member and into the tubular opening in the filter mass 83. It will be noted that the diameter of the opening 109 substantially corresponds to the size of the openings in the gaskets 91 and 93 so as to promote flow of the fuel into the mass. Screws 111 are secured to the deck plate and these extend through the gasket 107 and annular portion of the outer member 99, and nuts 113 on the screws serve to detachably connect the outer member to the deck plate.

With this novel organization, old cartridges are preferably readily removed from any one of the inner cylinders or canisters 79 by merely loosening the wing nut 101 and removing the nuts 113, whereupon the bolt assembly and cartridges connected thereto can be withdrawn, after which the old cartridges can be separated from the bolt assembly by removing the wing nut 101 and outer member 99 thereon from the rod so that the rod can be slid out of the cartridges. To replace new cartridges, they are first threaded into the rod. The outer member 99 and wing nut are then successively attached to the rod, after which the nut is preferably tightened to hold the cartridges in a desired compressed relationship between the inner and outer members 95 and 99. The complete assembly is then inserted into a cylinder 79, after which the outer member 99 is anchored to the deck plate by the nuts 113. The wing nut is again tightened until the outer member engages the stop or abutment 103 on the rod which determines the amount of compression or force exerted on the cartridges to properly maintain them in a sealed end-to-end relationship so that the fuel introduced into the entrance chamber 11 will flow only into and through the filter mass 83, filter fabric 81, through the apertures in the cylinder 79 and filter fabric 85 and into the outer containers or canisters 31.

The sump 21 may be designed and constructed as desired but as disclosed herein comprises a receptacle secured in spaced relationship to the underside of the tank by a tubular fitting 115 affording communication between the water receiving chamber 15 and the receptacle so that water droplets received in the chamber may accumulate in the receptacle. A valve not shown is controlled by a float 117 for automatically releasing the water from the receptacle when the water therein reaches a predetermined level. As a safety factor a pipe 119 is communicatively connected to the central chamber 27 at a location in the bottom of the tank housing 33 just back of the front frame or mounting 55 and to the sump receptacle at a location below the normal water level therein. Thus, any free water droplets which for any reason might fall into the bottom of the central chamber, due to the inclination of the tank will find their way by gravity into the receptacle by way of the pipe 119.

The operation of the system is unique and constitutes an important advance in the field of conditioning or filtering of liquids, and particularly liquid fuel used in jet aircraft. The contaminated fuel to be filtered free of foreign matter and water is introduced into the entrance chamber 11 through the inlet 13. After entering the chamber 11 the fuel flows through the openings 109 and 49 in the outer members 99 and deck plate 17, and through the holders 51 into the longitudinal passages or openings formed by the plurality of cartridges axially aligned in the inner cylinders or canisters 79. After entering the cartridges the fuel flows laterally or radially through the masses of fibers 83, the filter wraps 85, the apertures in the inner cylinder, and the external filter wraps 81 surrounding the cylinders. The filter means which may comprise filter masses 83 and the filter wraps 85 and/or all of the other aforesaid components has the inherent quality or phenomenon of causing any water in the fuel to coalesce and gradually form into droplets of a relatively large uniform size on the exterior surface of the external wraps, from whence they fall into the channels 71 of the outer containers or canisters 31 and due to the fact that the tank is normally disposed at a slightly inclined position with respect to the horizontal the droplets falling into the channels will be directed in a direction reverse to the normal flow of the fuel toward the deck plate until they fall by gravity into the water receiving chamber 15, and from there into the sump 21. The filtered fuel and water separate in the outer containers and while the water is being directed into the water receiving chamber the filtered fuel flows upwardly through the upper screen members 73 and out into the central chamber 27 and then flows generally into the deceleration area, through the safety screen 61 and out through the outlet 25. If for any reason droplets of water appear in the fuel in either or both of the central and axial chambers, they will accumulate in the bottom of the tank and run off into the sump through the pipe 119. With this novel organization the water filtered out of the contaminated fuel is shunted out or carried away so that it will not flow into the central chamber 27 of the tank. Otherwise expressed, the water is promptly or initially removed from the contaminated fuel without traveling therewith for a longer period of time or travel before removal as a conventional apparatus.

It is obvious that various changes may be made in the form, structure and arrangements of parts without departing from the spirit of the invention. Accordingly, applicant does not desire to be limited to the specific embodiment disclosed herein primarily for purposes of illustration; but instead, he desires protection falling fairly within the scope of the appended claims.

I claim:

1. In combination: a horizontal tank provided with an inlet and an outlet, a support disposed in the tank and forming therewith an entrance chamber for receiving through the inlet a liquid containing water, a partition disposed in the tank and forming with the tank and support a water receiving chamber and an adjacent circulating chamber with the water receiving chamber arranged between the entrance and circulating chambers, a container having its longitudinal axis horizontally disposed and communicating with the entrance chamber and extending into the circulating chamber, a filter disposed in the container on an axis substantially parallel to the axis of said container for coalescing the water in the liquid and depositing it in the container, and said container comprising a part provided with apertures through which the filtrate may flow into the circulating chamber and into the outlet and a non-perforated channel part disposed beneath said filter for directing the water back into the receiving chamber.

2. The combination defined in claim 1, including a sump communicating with the water receiving chamber for collecting the water after passing through the water receiving chamber.

3. The combination defined in claim 1, including a sump for collecting the water from the water receiving chamber, and a pipe providing communication between the circulating chamber and the sump.

4. A tank having an inlet and fuel outlet, a filter-coalescer unit, means for supporting said filter-coalescer unit horizontally in the tank between the inlet and fuel outlet so that all the fuel will pass through the coalescer unit for coalescing water in the fuel, said filter-coalescer unit adapted to separate the water and allow the filtrate to flow towards the fuel outlet, fuel pervious separating means including a solid channel portion beneath said coalescer unit having its longitudinal axis disposed horizontally and parallel with the axis of said filter-coalescer unit, said separating means surrounding and spaced from the filter-coalescer unit and directing the water to a portion of the tank isolated from the fuel outlet and away from the filter-coalescer unit as the water separates therefrom and thereby prevents its entry into the filtrate passing through the fuel outlet.

5. The structure defined in claim 4, in which the tank is inclined so that the structurally related means will cause the water to travel in a direction reverse from the flow of the filtrate.

6. The structure defined in claim 4, in which the structurally related means surrounds the filter means and is inclined so that the water will travel in a direction different from that of the filtrate said structurally related means comprising an upper semi-cylindrical member of fine porous material adapted to pass fuel therethrough, and a lower semi-cylindrical channel member.

References Cited in the file of this patent

UNITED STATES PATENTS

| | | |
|---|---|---|
| 2,404,872 | Walker | July 30, 1946 |
| 2,555,607 | Robinson | June 5, 1951 |
| 2,556,722 | Hersberger | June 12, 1951 |
| 2,597,475 | Grise | May 20, 1952 |
| 2,609,932 | Fricke | Sept. 9, 1952 |
| 2,626,709 | Krieble | Jan. 27, 1953 |
| 2,657,808 | Mankin | Nov. 3, 1953 |
| 2,725,986 | Marvel | Dec. 6, 1955 |
| 2,770,367 | Donato | Nov. 13, 1956 |